US00RE36369E

United States Patent [19]

Wajer et al.

[11] E Patent Number: Re. 36,369

[45] Reissued Date of Patent: Nov. 2, 1999

[54] STABILIZED PRESSURE-HYDRATED MAGNESIUM HYDROXIDE SLURRY FROM BURNT MAGNESITE AND PROCESS FOR ITS PRODUCTION

[75] Inventors: Mark Thomas Wajer, Baltimore, Md.; Joseph T. Witkowski, Chesterfield, Mo.; David M. Smith, Kearneysville, W. Va.

[73] Assignee: Martin Marietta Magnesia Specialties, Inc., Raleigh, N.C.

[21] Appl. No.: 08/754,178

[22] Filed: Nov. 19, 1996

Related U.S. Patent Documents

Reissue of:

[64] Patent No.: 5,487,879
Issued: Jan. 30, 1996
Appl. No.: 08/275,473
Filed: Jul. 15, 1994

[51] Int. Cl.[6] ..... C01F 5/14

[52] U.S. Cl. ..... 423/155; 423/175; 423/636

[58] Field of Search ..... 423/155, 175, 423/636

[56] References Cited

U.S. PATENT DOCUMENTS

| | | | |
|---|---|---|---|
| Re. 28,807 | 5/1976 | Panzer et al. | 260/2 BP |
| Re. 28,808 | 5/1976 | Panzer et al. | 260/2 BP |
| 2,087,089 | 7/1937 | Hall | 167/72 |
| 2,309,168 | 1/1943 | Corson | 23/138 |
| 2,335,373 | 11/1943 | Woodward | 210/62 |
| 2,356,760 | 8/1944 | Garvin | 23/188 |
| 2,408,324 | 9/1946 | Loomis et al. | 106/109 |
| 2,408,647 | 10/1946 | Huntzicker et al. | 23/188 |
| 2,409,546 | 10/1946 | Corson | 23/188 |
| 2,489,033 | 11/1949 | Huntzicker | 23/313 |
| 2,902,346 | 9/1959 | Volk | 23/188 |
| 3,288,770 | 11/1966 | Butler | 260/88.3 |
| 3,410,649 | 11/1968 | Sellet | 8/94.33 |
| 3,582,461 | 6/1971 | Lipowski | 162/72 |
| 3,658,473 | 4/1972 | Sese | 23/201 |

(List continued on next page.)

FOREIGN PATENT DOCUMENTS

| | | | |
|---|---|---|---|
| 0293642A2 | 7/1988 | European Pat. Off. | C08F 8/34 |
| 0 293 642 | 12/1988 | European Pat. Off. . | |
| 1215118 | 4/1966 | Germany . | |
| 246 971 A1 | 2/1986 | Germany . | |
| 246971 | 6/1987 | Germany | 423/636 |
| 54-150395 | 11/1979 | Japan . | |
| 56-73623 | 6/1981 | Japan . | |
| 56-73624 | 6/1981 | Japan . | |
| 56-140025 | 11/1981 | Japan . | |
| 61-291413 | of 1986 | Japan . | |
| 6-191832 | 12/1992 | Japan . | |
| 592431 | 8/1975 | U.S.S.R. . | |
| 559899 | 6/1977 | U.S.S.R. . | |
| WO 91/07512 | 5/1991 | WIPO . | |
| WO 93/16268 | 8/1993 | WIPO . | |
| WO 94/24047 | 10/1994 | WIPO . | |

OTHER PUBLICATIONS

*Burning, Cooling, Drying and Hydrating,* B–251 (no date available).

*The Corson Explosion Method of Continuous Pressure Lime Hydration* (2 page article). (no date available).

R. S. Boynton, Definitions and Properties of Limes, *Chem. and Tech. of Lime and Limestone* 4.1.1 (1966).

*J. of Research of the Natural Bureau of Standards*, 19:234–236. (Aug., 1937).

L.S. Wells et al., *Hydration of Magnesia in Dolomitic Hydrated Limes and Putties,* 19:215–233 (Aug., 1937).

*Chemical Marketing Reporter* ISSN:0900–0907 (Jan. 1994).

*Primary Examiner*—Wayne Langel
*Attorney, Agent, or Firm*—McDermott, Will & Emery

[57] ABSTRACT

A stabilized, pressure-hydrated magnesium hydroxide slurry and a process for its production from burnt magnesite are described. According to an embodiment of the invention, a mixture comprising burnt natural magnesite and water is pressure hydrated to provide a pressure hydrated slurry. The pressure hydrated slurry is then deagglomerated. If desired, chloride ions and cationic polymer can be added to further stabilize the slurry.

15 Claims, 2 Drawing Sheets

U.S. PATENT DOCUMENTS

| | | | |
|---|---|---|---|
| 3,692,898 | 9/1972 | Gorman et al. | 424/158 |
| 3,738,945 | 6/1973 | Panzer et al. | 260/2 BP |
| 3,915,904 | 10/1975 | Tonkyn et al. | 260/2 BP |
| 3,957,674 | 5/1976 | Sano et al. | 252/182 |
| 4,147,627 | 4/1979 | Goodman | 210/58 |
| 4,155,741 | 5/1979 | Scher et al. | 71/65 |
| 4,164,521 | 8/1979 | Goodman | 525/187 |
| 4,166,040 | 8/1979 | Goodman | 252/180 |
| 4,166,041 | 8/1979 | Goodman | 252/180 |
| 4,230,610 | 10/1980 | Falcione et al. | 260/29.6 M |
| 4,375,526 | 3/1983 | Zupanovich et al. | 524/436 |
| 4,376,583 | 3/1983 | Alford et al. | 356/237 |
| 4,412,844 | 11/1983 | Collins et al. | 44/51 |
| 4,430,248 | 2/1984 | Rey | 252/313 R |
| 4,548,733 | 10/1985 | Vincent | 252/310 |
| 4,649,738 | 3/1987 | Waldie et al. | 73/38 |
| 4,743,396 | 5/1988 | Fong et al. | 252/313.1 |
| 5,076,846 | 12/1991 | Buri et al. | 106/401 |
| 5,143,965 | 9/1992 | Mertz | 524/436 |
| 5,211,239 | 5/1993 | Thomas et al. | 166/308 |
| 5,487,879 | 1/1996 | Witkowski et al. | 423/155 |
| 5,514,357 | 5/1996 | Richmond et al. | 423/265 |

STABILIZED PRESSURE-HYDRATED MAGNESIUM HYDROXIDE SLURRY FROM BURNT MAGNESITE AND PROCESS FOR ITS PRODUCTION

Matter enclosed in heavy brackets [ ] appears in the original patent but forms no part of this reissue specification; matter printed in italics indicates the additions made by reissue.

FIELD OF THE INVENTION

This invention concerns a method of producing a pumpable, stable magnesium hydroxide slurry by pressure hydration and stabilization of burnt natural magnesite.

BACKGROUND OF THE INVENTION

Magnesium hydroxide in slurry form is useful as a pumpable source of magnesium hydroxide for various chemical processes, including but not limited to the following: (1) pH adjustment, including waste acid and acidic wastewater neutralization; (2) wastewater treatment, including precipitation of heavy metal contaminants; (3) scrubbing and neutralization of acidic vapors in flue gases or process off-gases; and (4) production of specialty magnesium compounds (e.g. $MgSO_4$, $MgNO_3$, $MgCl_2$, etc.) as a source of magnesium.

By providing magnesium hydroxide in slurry form of at least moderate quality, capital extensive and potentially dangerous (due to the hydration exotherm) MgO powder slaking operations are eliminated for the end user. Magnesium hydroxide slurries of such quality have additional advantages including the ability to be easily handled and stored, and the ability to be reliably dosed to chemical processes as desired. In fact, such magnesium hydroxide slurries can be transported to the point of application and stored for time periods of days to several weeks under intermittent to constant agitation without incurring adverse effects such as settling of solids and excessive viscosity.

Lower quality atmospheric hydrated magnesium hydroxide products produced from burnt natural magnesite are common, but in many cases do not have the above desirable characteristics and can cause numerous processing difficulties including the following: product inhomogeneity; obstruction of transport pipelines, valves, processing equipment and storage equipment; formation of an impacted bed of non-pumpable magnesium hydroxide solids at the bottom of storage tanks and process vessels: inconsistent or insufficient feed rate to processes: excessive energy costs for transporting/pumping the product; and high maintenance costs for systems incorporating the product.

At present, however, the only moderate to high quality magnesium hydroxide slurries available are believed to be synthetic magnesium hydroxide products produced from the soluble magnesium present in brine fields and seawater. For economic reasons, these synthetic magnesium hydroxide slurries are generally produced in close proximity to sources or brine or seawater.

SUMMARY OF THE INVENTION

In view of the above, there is presently a need for a magnesium hydroxide slurry produce of at least moderate quality which can be produced from geographical sources of natural magnesite ore that are not necessarily linked to the brine fields and coastal areas currently necessary for the production of synthetically produced magnesium hydroxide products.

At the time of the invention, it was not believed to be economically feasible to produce a magnesium hydroxide slurry from burnt natural magnesite that would be or sufficient stability to be stored for long periods of time or transponed over long distances, without settling into an impacted bed.

Nonetheless, the present inventors have developed a process for producing a moderate quality, pumpable, stabilized aqueous slurry of magnesium hydroxide that is produced from burnt natural magnesite. In particular, a process for the production of a stabilized magnesium hydroxide slurry has been developed in which a mixture containing burnt natural magnesite and water is pressure hydrated to provide a precursory pressure hydrated magnesium hydroxide slurry. A key aspect of the stability of the final product is based on the synergistic reaction between two stabilizing additives: chloride ions and cationic polymer. These additives, along with the precursory pressure hydrated magnesium hydroxide slurry are processed through a disperser to provide a stabilized slurry.

The magnesium hydroxide slurry produced by the method of the present invention has many advantages, including but not limited to the following: (1) hydration time is significantly reduced compared to atmospheric hydration, resulting in reduced production cycle time; (2) the magnesium hydroxide particle size distribution of the product of the invention is smaller than that of atmospheric hydrates, contributing to improved slurry stability; (3) maintenance costs are reduced compared to atmospheric hydrates since the pressure hydration step produces hydrate particles that are easier to deagglomerate and stabilize than atmospheric hydrate particles; (4) pumping and agitation costs are low relative to atmospheric hydrates; (5) cleanout costs for removing settled or impacted solids from the bottom of storage or process vessels, from pipelines, from transportation vessels (e.g., tank trucks), and so forth are lower than atmospheric hydrates; (6) systems and piping networks already in place are amenable to conversion from another alkali hydroxide (such as that produced from lime) to magnesium hydroxide, or from a premium quality magnesium hydroxide to a moderate quality magnesium hydroxide; (7) the end user may avoid modifying the application system layout and operating procedures, or upgrading existing equipment to facilitate use of the magnesium hydroxide slurry from burnt magnesite; and (8) the process is not necessarily linked to particular geographic areas for economic delivery of raw materials, allowing facilities employing the process to be located strategically to supply targeted markers with the advantage of relatively low product shipping costs.;

DETAILED DESCRIPTION

Figure 1:
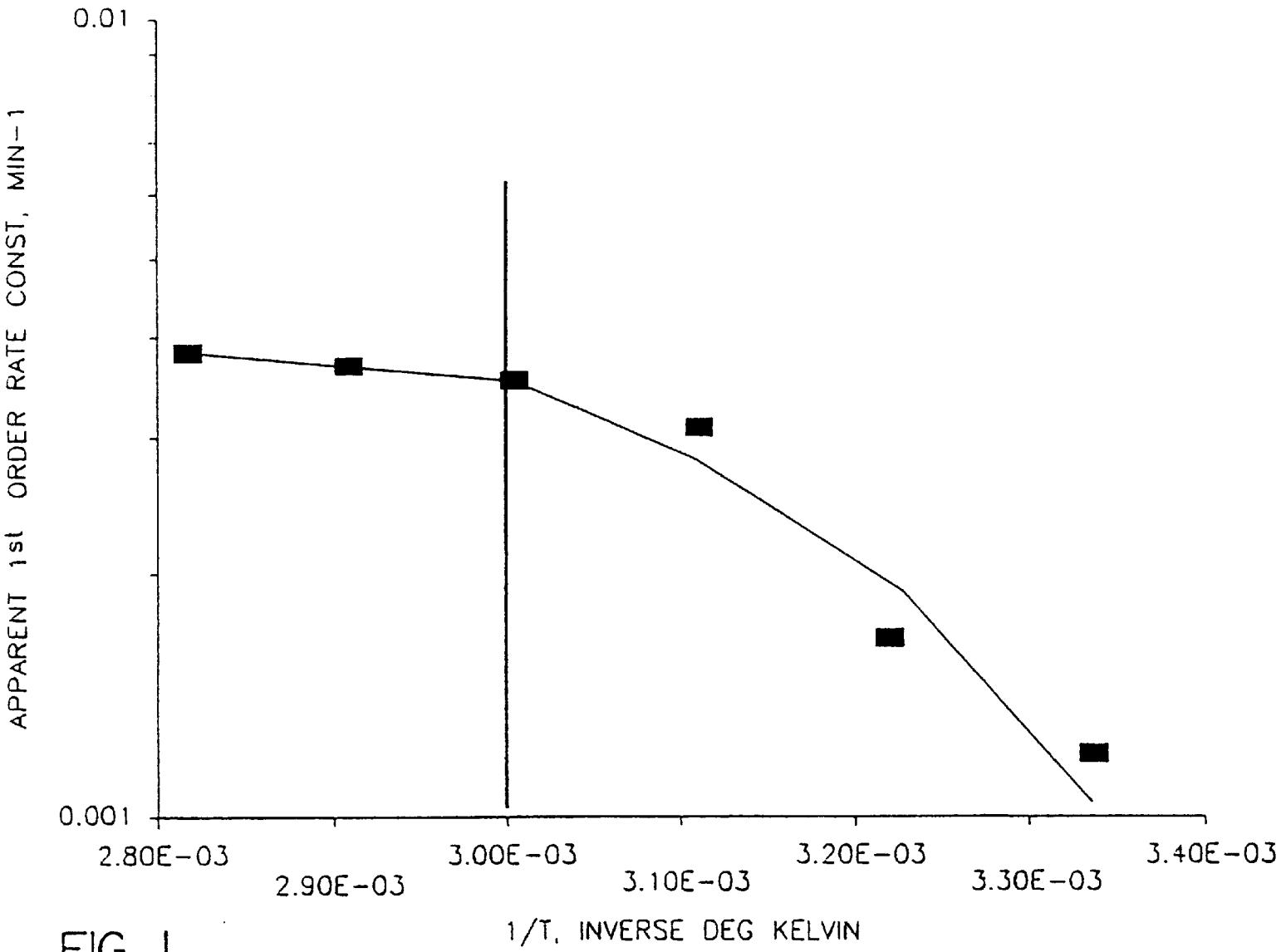
FIG. 1 is an Arrhenius plot based on the atmospheric hydration reaction of burnt natural magnesite.

According to an embodiment of the invention, the principal processing requirements for the production of a stable, pumpable, moderate quality magnesium hydroxide slurry from burnt natural magnesite are (1) pressure hydration; and (2) stabilization.

As used herein, the term "moderate quality" slurry encompasses the following characteristics: (1) percent solids by weight is at least 50%, preferably 55–65%; (2) Brookfield Viscosity at room temperature is 50–900 centipoise (cps), preferably 50–300 cps; (3) pourability/flowability is such that greater than 80% by weight, preferably greater than 90% by weight, of sample pours off after 7 days of undisturbed gravity settling; (4) after 7 days of undisturbed (unagitated) gravity settling, water separation is less than 1 inch, preferably less than ½ inch, with the height of water separation being measured in a standard, cylindrical 8 oz. poly channel bottle (2 in. OD×5⅜ in. height); and (5) settled solids are readily re-suspendable with minimal agitation intensity. For many applications, resuspendability is much more critical than long-term slurry homogeneity, since intermittent agitation can be provided at the point of application.

PRESSURE HYDRATION

In endeavoring to produce a magnesium hydroxide product from burnt magnesite, the inventors have unexpectedly discovered that pressure hydration of burnt magnesite, preferably in the presence of chloride ions, can result in a moderate to high quality product at competitive cost.

The magnesite of the present invention is preferably obtained from natural sources. Large deposits of natural magnesite arc found, for example, in the United States, Canada, China, Korea, Australia, Greece, Spain, Brazil, Turkey, Austria, Czechoslovakia, Russia, Ukraine, Yugoslavia, Italy, India, Nepal and South Africa.

The chemical composition of burnt natural magnesite preferably comprises about 85 to 99 weight % MgO (ignited basis), and is derived by the thermal decomposition of magnesite ore ($MgCO_3$) to form magnesium oxide (MgO) and carbon dioxide ($CO_2$). Typical chemical composition of MgO and various major impurities of the preferred burnt magnesite ore of the present invention are summarized in Table 1A.

TABLE 1A

| RANGE OF TYPICAL VALUES | |
|---|---|
| MgO, weight % (ignited basis) | 86.0–98.0 |
| CaO | 0.70–4.0 |
| $SiO_2$ | 0.25–11.0 |
| $Fe_2O_3$ | 0.07–4.5 |
| $Al_2O_3$ | 0.06–0.85 |

The burnt natural magnesite used in the practice of the present invention is preferably as finely divided as is commercially feasible, preferably passing through a 20 mesh screen, more preferably passing through a 100 mesh screen.

The burnt natural magnesite used in the practice of the present invention can be produced using kilns of various designs including static shaft kilns, rotary kilns. Herreshoff kilns, step kilns, and so forth.

Hydration of the burnt natural magnesite comprises the reaction between the magnesium oxide, MgO, and water to produce magnesium hydroxide, $Mg(OH)_2$. At atmospheric pressure and at temperatures less than or equal to 212° F., however, completely hydrating burnt natural magnesite takes as long as a week. The reactive portion hydrates relatively quickly at temperatures attainable at atmospheric pressure, but the less reactive portion hydrates extremely slowly under such conditions.

By contrast, the inventors have found that pressure hydration provides an expedient method of hydrating burnt natural magnesite, apparently by overcoming pore diffusion and mass transfer resistances as discussed in Example 3 below. Regardless of the mechanism by which hydration occurs, super-atmospheric pressures and corresponding saturation temperatures dramatically increase the rate of hydration of the subject burnt natural magnesite. For example, hydration time is reduced from periods on the order of days at atmospheric pressure to period on the order of hours or minutes at super-atmospheric pressures.

In conducting pressure hydration, it is preferred to couple the pressurized hydration equipment with a means of recovery heat to enable the re-use of heat evolved during hydration (an exothermic reaction). For example, if batch processing is selected, later batches can be pre-heated with energy evolved from present batch, using recuperative heat transfer. The exotherm can also be used effectively to overcome the activation energy barrier of the hydration reaction and speed up hydration. Of course, energy can also be recovered if a continuous processing mode is selected.

Depending on volume, operating pressure, material of construction and processing mode (batch or continuous), the hydration vessels selected can be, for example, vertical, agitated pressure vessels (better suited to batch processing), horizontal, paddle-agitated cylindrical vessels sloped to improve vessel discharge (better suited to continuous processing) and so forth.

Hydration pressures are preferably 1 to 150 psig, more preferably 25 to 100 psig, with the actual pressure selected based on capital costs, energy costs and so forth.

STABILIZATION

The magnesium hydroxide slurries of the invention are preferably stabilized by subjecting the hydrated slurry to chemical and mechanical treatment.

Mechanical treatment of the hydrated slurry of the invention it preferably performed to deagglomerate the product and disperse any desired additives. Commercially-available equipment which can be used for this purpose include homogenizers and high-speed shear mixers such as tandem shear pipeline mixers, high-speed dispersion blades, homogenizer/reactors, in-line static mixers, agitated hold-up tanks and other suitable devices.

Chemical stabilization of the hydrated slurry of the invention is preferably accomplished by the addition of chloride ions and cationic polymer. As shown below in the Examples, chloride ions and cationic polymer provide a product of surprisingly high stability that is readily suspendable with mild, intermittent agitation. Any solid settlement of the magnesium hydroxide slurries of the present invention is soft, as opposed to a tacky, impacted bottom solid that is formed without the addition of either of these materials.

[Prior to the present invention, it was known that the addition of chlorides to magnesium hydroxide slurries would contribute to the stability and suspendability of the product.] In fact, chlorides are intentionally removed from brine and seawater based magnesium hydroxide slurries by washing. Chloride ions are known to accelerate various corrosion processes. Nevertheless, chlorides ions are intentionally added to the magnesium hydroxide slurry in accordance with the present invention, resulting in an unexpected increase in stability and resuspendability.

Preferred sources of chloride ions for the practice of the invention include calcium chloride, sodium chloride, aluminum chloride, magnesium chloride potassium chloride, ammonium chloride, hydrated species such as $CaCl_2.H_2O$, $CaCl_2.\ 2H_2O$, $CaCl_2.6H_2O$, $MgCl.6H_2O$, $AlCl_3.6H_2O$ and so forth. The most preferred chloride salt is calcium chloride, which can be added, for example, as a $CaCl_2$ brine or as ground prills no dry $CaCl_2$.

According to an embodiment of the invention, the chlorides are charged to the hydrator prior to the hydration reaction. The chlorides tend to cause a larger particle size distribution exiting the hydrator, but the larger agglomerates can be deagglomerated to produce a slurry product that is more stable than one without chlorides. For example, a pressure-hydrated slurry with a larger hydrate particle size distribution can be deagglomerated by passing through one of the mechanical devices discussed above.

Concentrations of chloride ions used in the practice of the present invention preferably range from 0.01 to 2.5 weight % of dry MgO, more preferably 0.2 to 0.5 weight % of dry MgO. It is noted that burnt magnesite reactant is inherently low in chlorides, with chloride concentrations being on the order of 0.001 to 0.01 weight % of dry MgO.

Along with the chloride ions, addition of cationic polymer stabilizes the slurry by synergistic action and produces a readily suspendable material.

Cationic polymers are known to be useful for adjusting viscosity to within an acceptable range. [However, prior to the present invention, it was not known that cationic polymers could be used to improve the stability and resuspendability of magnesium hydroxide slurries.] Indeed, the fact that cationic polymers are used to decrease viscosity suggests that the resulting product will exhibit a decrease in stability. This is because in general solids are known to settle faster in less viscous solutions than in more viscous solutions. However, the inventors have found, to the contrary, that stability *of a pressure hydrated magnesium hydroxide slurry* can be increased by such additives.

The cationic polymer is preferably added after hydration, as cationic polymers are generally unstable at the hydration temperatures preferred for the practice of the invention. Preferred polymers include cationic species particularly preferred are polyamine polymers. The preferred anion for the polymer is the chloride ion.

Preferred concentrations of the polymer range from 0.01 to 2.0 wt. % slurry weight basis, more preferably 0.1 to 0.20 wt. % slurry weight basis. Ideally, the polymer should yield a product with a viscosity of 50–900. preferably 50–300 centipoise.

Figure 2:
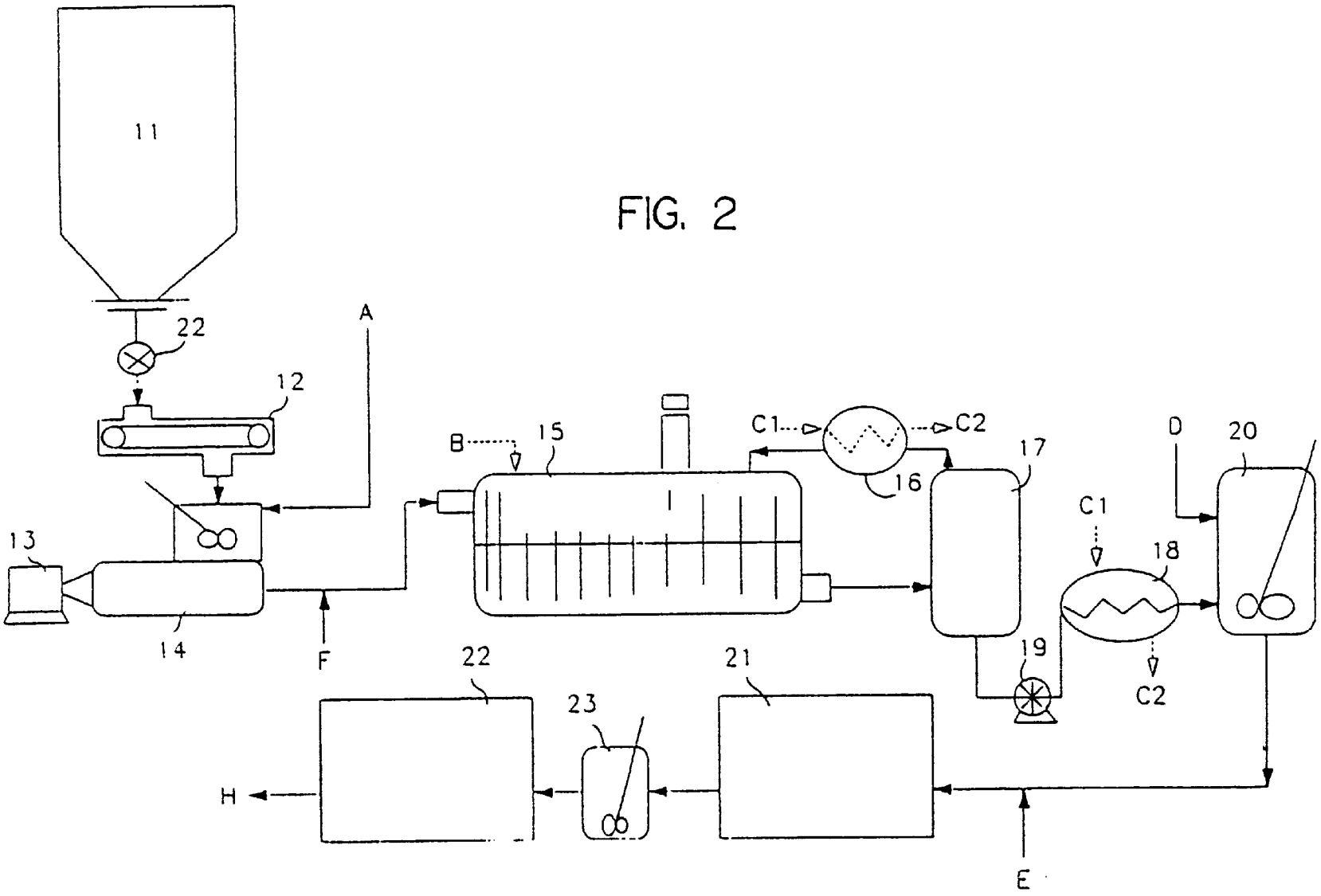
FIG. 2 is a schematic diagram of a possible embodiment of the method of the present invention.

It will be clear to the one of skill in the art that a near-infinite number of processing facilities can be constructed to carry out the present invention. One such facility is shown in FIG. 2. The various hydration and stabilization apparatus shown in FIG. 2 reflect commercially-available equipment of standard construction.

Referring now to FIG. 2, burnt natural magnesite stored in storage silo 11 passes through valve 22 to weigh belt feeder 12. The burnt natural magnesite introduced by way of weigh belt feeder 12 is then mixed with water from process water supply A in mix/wet-in tank unit 14 with accompanying piston pump 13. An input of chloride ions F is fed into the mixture of burnt natural magnesite and water emerging from the mix/wet-in tank unit 14 and the resulting mixture enters hydrator 15, where an input of steam B is introduced to achieve the appropriate hydrating temperature and pressure. Depending on whether the process is being started up or is operating continuously, the heat of reaction may be sufficient to maintain hydrator temperature and pressure, obviating the need for outside steam. The resulting hydrated slurry then enters flash vessel 17, where the steam that is flashed off is passed through reflux condenser 16. The steam is condensed with an input of cold water C1 which emerges as cold water output C2. The condensed steam is returned to the hydrator to reuse its sensible heat. The hydrated slurry is then pumped by pump 19 through heat exchanger 18, where the slurry is cooled by accompanying cold water input C1, which emerges as cold water output C2. The cooled slurry emerging from heat exchanger 18 then enters dispersator surge tank 20 where it is mixed with make-up/cooling water from water input stream D to adjust percent solids into the target range as necessary. The slurry then exits the dispersator surge tank 20 where it is combined with cationic polymer from stabilizing polymer input stream E, and the resultant mixture is introduced into a first dispersator 21. The slurry to emerging from the first dispersator 21 passes through interpass surge tank 23 and enters second dispersator 21. The stabilized slurry finally emerges as output stream H.

Many additional processing schemes will become quickly apparent to those skilled in the art. For example, the scheme in FIG. 2 is a continuous processing scheme, but batch and semi-batch processes will quickly become apparent. As another example, the scheme shown in FIG. 2 comprises two separate dispersators, but several passes can be made through a single dispersator if desired.

The various sources of chloride ions, cationic polymers, processing equipment, processing parameters, and so forth, to be used in a particular application of the present invention can be evaluated, for example, using the 7 and 14 day pour tests discussed below to determine the optimal process for the desired application.

The invention will be further clarified by consideration of the following examples, which are intended to be purely exemplary of the use of the invention.

EXAMPLES

Example 1

Table 1B summarizes a laboratory analysis of Chinese burnt natural magnesite used in the Examples. Of course, the range of percent MgO and major chemical impurities can vary somewhat with burnt natural magnesite from other sources, or even within burnt magnesite taken from a single source. Table 1A above lists the various ranges of percent MgO and major chemical impurities that can be expected for a given sample of burnt natural magnesite.

TABLE 1B

| Chemistry | |
|---|---|
| MgO, weight % (ignited basis) | 97.16 |
| CaO, weight % | 1.18 |
| $SiO_2$, weight % | 0.49 |
| $Fe_2O_3$, weight % | 0.88 |
| $Al_2O_3$, weight % | 0.29 |
| Cl, weight % | 0.03 |
| $SO_3$, weight % | 0.36 |
| Screens, % passing | |
| 100 mesh | 99.9 |
| 200 mesh | 99.8 |
| 325 mesh | 97.3 |
| Median Particle Size, microns | 5.94 |

Samples of magnesium hydroxide slurry containing 55 to 57 weight % solids were produced from the above burnt natural magnesite as follows:

(1) a laboratory autoclave was charred with the burnt natural magnesite, water, and a 23 weight % $CaCl_2$ solution in relative amounts necessary to provide 0.5 weight % chloride concentration (MgO basis) and a 55–57 weight % (slurry basis) magnesium hydroxide solids product.

(2) the mixture of step (1) was pressure hydrated in the autoclave by heating and pressurizing the autoclave to 100 psig (328° F.). holding at 100 psig for 10 minutes, then cooling the sample to near ambient temperatures for safe handling in the laboratory. In field practice, however, as little as 20° F. of subcooling may be needed to prevent damage to downstream equipment. The heat-up period was approximately 50 minutes and cooldown took approximately 80 minutes. Hence, total residence time in the autoclave was 140 minutes.

(3) 1000 ppm (heat basis of polymer, added on a slurry weight basis) of cationic polymer (Nalco 91DA054, an aqueous solution of polyamine) was added to the product of step (2) while blending it low speed with a Shar dispersion blade.

(4) the slurry was then processed through an APV Gaulin Model 15MR-8TA laboratory homogenizer at 1500 psig and samples were withdrawn after one, two, and three passes.

Samples retained after hydration (without cationic polymer and homogenizer processing) are compared on the basis of magnesium hydroxide particle size in Table 2 with samples of product that had been provided with cationic polymer and processed with the homogenizer. Polymer was added only to the stabilized products. Particle size distributions in all cases were measured with a Micromeritics Sedrigraph 5100.

TABLE 2

| | | Chloride and Polymer | | |
|---|---|---|---|---|
| | | # of homogenizer passes @ 1500 psig | | |
| | Chloride Only 0 passes | 1 pass | 2 passes | 3 passes |
| weight % solids (measured by oven method) | 56.0 | 57.0 | 55.0 | 55.6 |
| cumulative mass weight % finer than equivalent spherical diameter | | Equivalent spherical diameter, microns | | |
| 90 | 57.2–67.0 | 39.3 | 36.6 | 39.7 |
| 70 | 40.3–45.6 | 23.0 | 21.4 | 21.4 |
| 50 | 31.4–37.2 | 13.9 | 12.0 | 11.5 |
| 30 | 22.0–28.6 | 3.8 | 2.8 | 2.6 |
| 10 | 0.2 | 0.2 | 0.3 | — |

It is apparent from Table 2 that the particle size distribution is improved with respect to slurry stability by passing through the homogenizer.

The above samples were subjected to 7 and 1.1 day stability testing and the results summarized in Tables 3 and 4 respectively. Pour tests were conducted using standard, cylindrical 8 oz. poly channel bottles (2 in. OD×5⅜ in. height). For many applications, resuspendability is much more critical than long-term slurry homogeneity, because intermittent agitation can be provided at the point of application. The limiting time period for slurry homogeneity is time of transportation to the site of application, which can range from as little as 2 hours to several days.

TABLE 3

| # of passes @ 1500 psig | Weight % poured after 7 days | Water Split, in. | Viscosity after 7-day pour & mix (centipoise) |
|---|---|---|---|
| 0 | 0* | | |
| 1 | 84.8 | 7/16 | 45 |
| 2 | 92.7 | 5/16 | 54 |
| 3 | 90.5 | ¼ | 66 |

*Solids form a very tacky, dense sediment during the sample cooling period. Only the water split pours off.

TABLE 4

| # of passes @ 1500 psig | Wt. % poured after 14 days | Water split, inches | Bottom solids description | viscosity after 14 day pour & mix (cps)(2) |
|---|---|---|---|---|
| 1 | 35.9 | 2⅛ | Tacky | 61.0 |
| 2 | 58.9 | 1 1/16 | Soft to bottom | 64.5 |
| 3 | 59.7 | 15/16 | Soft to bottom | 58.8 |

Note:
(2)Brookfield Viscometer, RVT, # 1 spindle @ 100 rpm.

The results presented in Tables 3 and 4 show that two stabilization passes resulted in soft settlement even after 7 and 14 days of undisturbed settling. Without adequate stabilization, the magnesium hydroxide solids settle and form a very tacky, impacted settlement.

The presence of chlorides is also important to the final product. In pour tests performed on slurry samples that were not dosed with the chlorides, only the clear layer of water separation pours off after seven days of static settling. In most cases where chloride is not added, a tacky, non-pourable layer of bottom solids form is within the first twenty-four hours of undisturbed settling. Obviously this condition renders the magnesium hydroxide unusable.

The effect of chlorides on particle size distributions for magnesium hydroxide made with and without 0.5 weight % (dry MgO basis) chlorides added to hydrator prior to hydration was also investigated. The results are summarized in Table 5 for samples as they emerged from the hydrator (no polymer treatment and no homogenization).

Table 5 clearly shows that the addition of chlorides increases the particle size of the resultant $Mg(OH)_2$ product apparently by agglomeration. However, particle size of the chloride-treated sample as nearly returned to non-chloride-treated levels after only one pass through the dispersator it 1500 psig (see Table 2, column 3).

TABLE 5

| Cumulative mass % finer than equivalent spherical particle diameter | Equivalent spherical particle diameter, microns: without chlorides | Equivalent spherical particle diameter, microns: with chlorides |
|---|---|---|
| 90 | 32.54 | 57.2–67.0 |
| 70 | 17.00 | 40.3–45.6 |
| 50 | 6.42 | 31.4–37.2 |
| 30 | 0.77 | 22.0–28.6 |
| 10 | 0.33 | 0.2 |

Example 2

Magnesium hydroxide slurry samples were prepared using she same formulation as in Example 1, but a different mechanical dispersator was used. A Silverson High Shear Mixer (laboratory batch mixer) was used in place of the APV Gaulin 15MR-8TA Homogenizer. Different replaceable mixing heads were used on the Silverson mixer to determine those that produce an acceptable magnesium hydroxide slurry product. 250-ml slurry samples were processed for 5 minutes with the laboratory batch mixer. The product samples are described below in Tables 6 and 7. Percent solids vary in these samples from 57 to 62 weight %. In both tables, samples with and without cationic polymer have been processed with the high speed mixer using the various to mixing heads. The product samples were characterized by several measures including percent solids and 7-day pour tests. Moreover, after 5 months of undisturbed settling, the samples were lightly agitated to re-suspend the settled solids and the viscosity was measured by Brookfield viscometer, is Finally, the particle size distribution was also investigated. As can be seen for some of the samples, the qualitative determination of resuspendability, as determined by probing the bottom solids with a glass stirring rod, was favorable despite pourable weight fractions less than 80%.

TABLE 6

| Mixing Head | chloride addition only: 7-day pour, wt. % | chloride addition only: water split, inches | chloride addition only: weight % solids | chloride addition only: Viscosity after 5 mo., cps(1) | chloride addition with cationic polymer: 7-day pour, wt. % | chloride addition with cationic polymer: water split, inches | chloride addition with cationic polymer: weight % solids | chloride addition with cationic polymer: Viscosity after 5 mo., cps(1) |
|---|---|---|---|---|---|---|---|---|
| Square-hole high shear screen | 55.8(2) | 3/8 | 59.3 | 110 | 67.3(3) | 5/8 | 59.9 | 110 |
| General purpose disintegrating head | 88.1(4) | 1 3/16 | 58.5 | 98 | 79.0(5) | 1 1/8 | 58.0 | 108 |
| Vertical slotted disintegrating head | 57.9(6) | 11/16 | 61.4 | 117 | 57.1(7) | 11/16 | 61.1 | 124 |
| Fine perforation emulsion screen | 27.7(8) | 3/4 | 61.2 | 178 | 92.6(9) | 3/4 | 57.8 | 102 |

Table 6 notes and comments:

(1) After undisturbed settling for 5 months, samples were lightly agitated. Viscosity was then determined by Brookfield Viscometer, RVT, #2 spindle at 100 rpm.

(2) Settled solids layer (2 1/4 inches) very pourable and easily resuspendable upon application of slight shear; relatively low pour fraction believed to be due to thixotropy or Bingham-plastic rheology. Very slight shearing/agitation makes settled solids pourable.

(3) Bottom slurry layer (1 13/16 inches) very pourable upon application of slight shear with no tacky build-up on bottom. Resuspendable.

(4) Bottom slurry layer (11/16 inch) readily pours upon application of slight shear; very little tacky build-up on bottom. Very slight thickening of settled solids layer.

(5) Bottom slurry layer (1 3/16 inch) readily pours upon application of slight shear; very little tacky build-up on bottom.

(6) Bottom slurry layer (2 11/16 inches) readily pours upon application of slight shear. Slight thickening around walls of container, but no tacky build-up on bottom.

(7) Bottom slurry layer (2 3/8 inches) very soft with no tacky build-up on bottom; readily re-suspended and made pourable thickening on walls of pour test container.

(8) Bottom slurry layer (3 7/8 inches) very soft with slight thickening on walls of pour test container; readily resuspended upon application of slight shear/agitation.

(9) Bottom slurry layer (1/2 inch) pours very readily with slight sheaar. No tacky build-up on bottom.

TABLE 7

| Silverson Mixing Head | w/out cationic polymer added before stabilization cumulative weight % finer than table entry particle size | | | | | with cationic polymer added before stabilization cumulative weight % finer than table entry particle size | | | | |
|---|---|---|---|---|---|---|---|---|---|---|
| | 90 | 70 | 50 | 30 | 10 | 90 | 70 | 50 | 30 | 10 |
| | particle size, microns | | | | | particle size, microns | | | | |
| Square hole high shear screen | 35.21 | 20.94 | 12.72 | 4.30 | 0.44 | 70.08 | 11.96 | 6.14 | 2.28 | 1.00 |
| General purpose disintegrating head | 23.90 | 13.03 | 7.20 | 2.06 | 0.35 | 26.06 | 11.36 | 5.74 | 0.77 | 0.35 |
| Vertical slotted disintegrating head | 35.61 | 23.44 | 15.40 | 8.34 | 0.73 | 35.94 | 23.13 | 15.33 | 8.45 | 0.62 |
| Fine perforation emulsion screen | 35.46 | 22.57 | 14.70 | 7.91 | 0.52 | 35.87 | 22.66 | 14.55 | 7.29 | 0.40 |

In the eight cases shown in Tables 6 and 7 above, it is apparent from qualitative probing and the 5-month viscosity measurements (5 months undisturbed settling followed by a single, light agitation), that with intermittent and moderate (3 to 5 on an agitation intensity scale of 1 to 10) agitation to resuspend settled solids, the magnesium hydroxide slurry will be acceptable for many applications. It is emphasized that the pour test, because of its quantitative nature, does not acknowledge slurry that is pumpable with bottom solids that readily resuspend after a light shear force is applied to overcome, for example, Bingham plasticity or zero-deformation rate resistance to flow. Table 7 also clearly shows the beneficial results obtained upon the addition of cationic polymer. For example, compare the 7 day pour percentages for samples with polymer (92.6 weight %) and without polymer (27.7 weight %) when using the fine perforation emulsion screen in connection with the Silverson Mixer. The particle size distributions summarized in Table 7 demonstrate that the above-noted increase in stability observed upon addition of cationic polymer is not due to a change in the particle size distribution of the resulting slurry.

Example 3

Laboratory studies were conducted to investigate the apparent kinetics of the hydration reaction of burnt magnesite. Although details of the reaction mechanism could not be established with certainty, rate-limiting phenomena can be recognized based on approximate activation energies. Results of these tests can be used to contrast the disadvantages of atmospheric hydration with the efficacy of pressure hydration. The results of these studies ire summarized in the Arrhenius plot of FlG. 1.

From FIG. 1, it was determined that the slope to the left of the vertical solid line was about −350° K., which corresponds to an apparent activation energy of about 2.9 kJ/g-mol. Since the apparent activation energy was less than about 4 kJ/g-mol, it is believed that pore diffusion and mass transfer control the reaction rate in this domain. On the other hand, the slope of the data points to the right of the vertical line is about 3600° K., corresponding to an apparent activation energy of about 30 kJ/g-mol. Since the activation energy is greater than about 12 kJ/g-mol, it is believed that the intrinsic surface reaction is controlling the kinetics in this regime.

In summary, based on the experimentally-determined value of the apparent activation energy, it is believed that the rate of atmospheric hydration of the subject burnt magnesite is limited by pore diffusion and mass transfer at temperatures between about 140° F., and 180° F. In terms of process and energy economics, this is a disadvantage since, in general, the rates of processes limited by pore diffusion or mass so transfer increase only as a fractional power of temperature. The overall result is a diminishing return on higher hydration temperatures and external energy costs.

No claims are made in the present invention with regard to understanding the mechanism underlying the efficacy of pressure hydration in shortening hydration time. It appears likely, however, that super-atmospheric pressures can provide the motive force (pressure differential) for "pumping" after through the labyrinth of pores in which the large majority of reactive MgO surface resides. With the pore diffusion and mass transfer resistances overcome, the intrinsic surface reaction (chemical conversion of MgO to $Mg(OH)_2$) probably controls the hydration rate. In this situation, the rate of reaction generally increases exponentially with increasing hydration temperature. The greater rate of return on external energy costs and process economics are thus probable advantages of pressure hydration over atmospheric hydration.

Other embodiments of the invention will be apparent to those skilled in the art From consideration of this specification or practice of the invention disclosed herein. It is intended that the specification and examples be considered as exemplary only with the true scope and spirit of the invention being indicated by the following claims.

We claim:

1. A process for the production of a stabilized magnesium hydroxide slurry comprising the steps of:

*providing chloride ions to a mixture comprising burnt natural magnesite and water and then* pressure hydrating [a] *the* mixture [comprising burnt natural magnesite and water] to provide a precursory pressure hydrated magnesium hydroxide slurry;

providing [chloride ions and] cationic polymer *to the precursory pressure hydrated magnesium hydroxide slurry; and* deagglomerating said precursory pressure hydrated magnesium hydroxide slurry [in the presence of said chloride ions and cationic polymer] to provide a deagglomerated and stabilized magnesium hydroxide slurry comprising from 50 to 65 weight % solids.

[2. The method of claim 1, wherein said chloride ions are provided prior to pressure hydration.]

3. The method of claim [2] *1*, wherein said chloride ions are provided in an amount ranging from 0.01 to 2.5 weight % of dry MgO.

4. The method of claim [2] *1*, wherein said chloride ions are provided in an amount ranging from 0.2 to 0.5 weight % of dry MgO.

5. The method of claim 1, wherein said chloride ions are provided from at least one member selected from the group consisting of calcium chloride, sodium chloride, aluminum chloride, potassium chloride, magnesium chloride, ammonium chloride and hydrated salts thereof.

6. The method of claim 1, wherein said chloride ions are provided from calcium chloride.

7. The method of claim 1, wherein at least a portion of said chloride ions are provided by anions associated with said cationic polymer.

8. The method of claim 1, wherein said cationic polymer is provided in an amount ranging from 0.01 to 2.0 weight % of slurry weight.

9. The method of claim 1, wherein said cationic polymer is provided in an amount ranging from 0.1 to 0.2 weight % of slurry weight.

10. The method of claim 1, wherein said cationic polymer is a polyamine.

11. The method of claim 1, wherein said pressure hydration is conducted at pressures ranging from 1 to 150 psig.

12. The method of claim 1, wherein said pressure hydration is conducted at pressures ranging from 25 to 100 psig.

13. The method of claim 1, wherein said deagglomerated slurry comprises from 57 to 62 weight % solids.

14. The method of claim 1, wherein said burnt magnesite is finely divided and capable of passing through a 20 mesh screen.

15. The method of claim 1, wherein said burnt magnesite is finely divided and capable of passing through a 100 mesh screen.

16. The method of claim 1, wherein exothermic heat associated with the hydrating step is recovered.

* * * * *